United States Patent [19]

Yokoyama

[11] Patent Number: 4,723,970
[45] Date of Patent: Feb. 9, 1988

[54] GAS-WATER SEPARATOR

[75] Inventor: Takeshi Yokoyama, Hyogo, Japan

[73] Assignee: TLV Co., Ltd.

[21] Appl. No.: 826,782

[22] Filed: Feb. 6, 1986

[30] Foreign Application Priority Data

Feb. 15, 1985 [JP] Japan .............................. 60-21053[U]
Sep. 17, 1985 [JP] Japan ................................ 60-205630

[51] Int. Cl.<sup>4</sup> ........................................... B01D 45/12
[52] U.S. Cl. ........................................ 55/219; 55/435; 55/457
[58] Field of Search ................. 55/219, 218, 457, 456, 55/449, 448, DIG. 17, 435

[56] References Cited

U.S. PATENT DOCUMENTS

| 1,896,514 | 2/1933 | Hoyt | 55/456 X |
| 2,692,655 | 10/1954 | Peeps | 55/DIG. 17 X |
| 3,378,993 | 4/1968 | Veres et al. | 55/219 |
| 3,448,563 | 6/1969 | Sobeck | 55/457 X |
| 3,538,684 | 11/1970 | Esterhoy, Jr. et al. | 55/457 X |

FOREIGN PATENT DOCUMENTS 1481126 7/1977 United Kingdom .
2035151 6/1980 United Kingdom .

Primary Examiner—Kathleen J. Prunner
Attorney, Agent, or Firm—Toren, McGeady & Associates

[57] ABSTRACT

A gas-water separator provided with a cylindrical partition wall member disposed in an upper portion within a casing of the separator to form an annular space between the partition wall member and the casing, with rotary vanes being disposed in the annular space and with upper and lower portions of the annular space and an inside bore of the partition wall member being connected to an inlet side, a drain valve portion and an outlet side, respectively, of the separator. The separator is provided with obliquely, downwardly inclined walls and spiral walls, each projecting outwardly gradually from an upper end of each of the inclined walls toward a lower end thereof and connected in a stepped configuration to a radial end wall at the lower end of the inclined wall. The obliquely, downwardly inclined walls and the spiral walls are formed on an outer peripheral surface of the cylindrical partition wall member, and, consequently, fluid rotates in the annular space and moves more outwardly than in a tangential direction of the annular space so as to be blown in a better condition against the inner surface of the casing located around the annular space.

5 Claims, 4 Drawing Figures

GAS-WATER SEPARATOR

The present invention relates to a separator mechanism which is adapted to be attached to a pipe having therein gas, such as vapor or compressed air, in order to separate water (e.g., condensate) from the gas to the exterior. Particularly, the invention is concerned with a gas-water separator for separating gas and water from each other by the action of centrifugal force induced by rotating fluid.

In this type of gas-water separator, fluid is rotated at an upper portion within a casing and water drops contained in the gas are shaken out to the outside by the action of the resulting centrifugal force and thereby separated. The gas is passed to an outlet side, while the separated water drops are discharged to the exterior of the casing by a drain valve disposed in a lower portion within the casing.

According to the structure of a conventional gas-water separator, a cylindrical partition wall member is disposed in an upper portion within a casing to form an annular space between the partition wall member and the casing located outside the partition wall member. A multitude of obliquely, downwardly inclined rotary vanes are disposed radially in the annular space, and upper and lower portions of the annular space and an inside bore of the partition wall member are connected to an inlet side, a drain valve portion and an outlet side, respectively. In this structure, fluid from the inlet is rotated in the annular space by the rotary vanes, so that the water drops are shaken out to the outside by the action of centrifugal force. The water drops thus separated flow down and are discharged to the exterior by the drain valve. The gas at a central part of the rotating flow moves toward the outlet side through the inside bore of the partition wall member.

In the above conventional structure, the water drops are partially carried out to the outlet side, even if the rotating flow is strengthened and it has been impossible to enhance the gas-water separation efficiency beyond a certain degree.

This is due to a phenomenon whereby when the fluid is rotated, the larger the mass, the more outwardly will be the separation effect by the fluid by the action of centrifugal force. Thus, very small water droplets turn in from the outside to the inside along the surface, and, therefore, they are carried to the outlet side together with gas.

The present invention is directed toward providing a mechanism for adding means for catching water drops and shaking them out to the outside positively in a gas-water separator provided with rotary vanes.

SUMMARY OF THE INVENTION

Briefly, the present invention may be defined as a gas-water separator comprising a casing within which there is provided at an upper portion of the separator a cylindrical partition wall member forming an annular space between the partition wall member and the casing located outside the partition wall member, the annular space having upper and lower portions which, together with an inside bore of the wall member, are connected to an inlet side, a drain valve portion and an outlet side, respectively, defined by the casing. The separator further comprises obliquely, downwardly inclined walls and spiral walls, each projecting outward gradually from an upper end of each of the inclined walls toward a lower end thereof and connected in a stepped configuration to a radial end wall at the lower end of the inclined wall. The obliquely, downwardly inclined walls and the spiral walls are formed on an outer peripheral surface of the cylindrical partition wall member and are positioned in the annular space so that the moving direction of fluid is changed in an oblique, downward direction when passing through the annular space. Consequently, the fluid rotates in the annular space because of its continuity and this rotation extends to above and below the inclined wall. That is, the fluid enters the annular space while rotating and also exits under rotation. Since the spiral walls project outwardly gradually from upper ends toward lower ends of the inclined walls, the fluid moves more outwardly than in a tangential direction of the annular space and is blown in a better condition against the inner surface of the casing. Further, since the width of the annular space becomes smaller towards the lower end from the upper ends of the inclined walls, the speed of the rotating flow increases gradually and becomes a maximum at the lower end portion.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DETAILED DESCRIPTION OF THE PREFERRED EMBODIMENT

Figure 1:
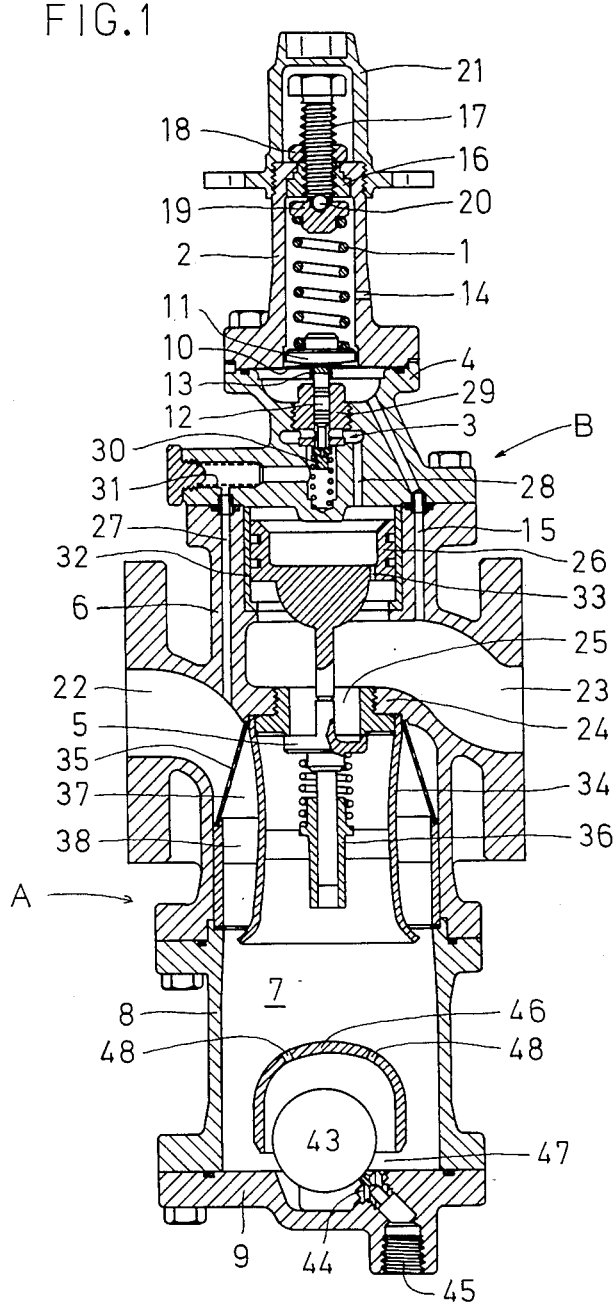
FIG. 1 is a longitudinal sectional view of an embodiment of the invention comprising an integral combination of a gas-water separator in accordance with the invention together with a reducing valve for vapor.

Referring now to the drawings, there is shown in FIG. 1 an integrated device which includes, in combination, a gas-water separator A structured in accordance with the present invention and combined with a reducing valve B for vapor.

The mechanism includes a casing comprising a spring case 2 which encloses a pressure setting spring 1 therein, a valve case 4 in which is disposed a pilot valve 3, a body 6 in which is disposed a main valve 5, a separator casing 8 which forms a gas-water separation chamber 7, and a bottom cover 9. These components are formed by casting.

A diaphragm 10 formed by a thin metallic plate is held between the spring case 2 and the valve case 4.

A lower end of the pressure setting spring 1 is in contact with an upper surface of the diaphragm 10 through a diaphragm disc 11, while an upper end of a cap 13 attached to a pilot valve stem 12 of the pilot valve 3 is in contact with a lower surface of the diaphragm. The space above the diaphragm 10 is connected to the outside air through a passage 14, while the space therebelow is connected to a later-described output 23 through a passage 15.

An adjusting screw 17 is attached to a ceiling wall of the spring case 2 through a stainless steel bearing 16 and is swivel-stopped with a lock nut 18. A steel ball 20 is disposed between the adjusting screw 17 and a spring shoe 19 disposed on an upper end of the pressure setting spring 1.

The portion of the adjusting screw 17 which projects to the exterior is covered with a protective cap 21 which is removably threadedly connected to the spring case 2.

The body 6 is formed with an inlet 22 and an outlet 23. The inlet 22 and the outlet 23 are separated through a horizontal wall 24 and are interconnected through a valve port 25 of a valve seat member which is threadedly connected to the wall 24. The main valve 5 is disposed below the valve port 25 while being held in a resiliently urged state by means of a coiled spring. Its upper end is connected to a piston 26.

The pilot valve 3 is positioned between a passage 27 leading to the inlet 22 and a passage 28 leading to a space formed above the piston 26. It comprises the pilot valve stem 12 adapted to slide through a pilot valve seat 29 and a pilot valve element 30 connected to the lower end of valve stem 12, and it is urged upwardly from below by means of a spring. A screen 31 is disposed in the passage 27.

The piston 26 is adapted to slide within a cylinder 32 which is attached to the inner periphery of body 6, and two annular grooves are formed in the outer periphery of a piston in which are disposed piston rings formed of polytetrafluoroethylene (PTFE) and springs inside the piston rings. The piston 26 is further provided with an orifice 33 which connects upper and lower surfaces of the piston to release therethrough a certain amount of fluid from the upper surface of the piston to thereby effect pressure control.

A generally cylindrical double partition wall member 34 is disposed around the main valve 5 of the reducing valve B. An outside cylinder is straight and it is formed lower than an inside cylinder which is gently divergent at the upper and lower portions thereof. A tapered screen 35 is disposed outside the partition wall member 34. A connecting rod 36 is integrally formed inside the partition wall member 34 on a central axis through a rib to guide a lower portion of the main valve 5. The inlet 22 is connected through the screen 35 to an annular space 37 which is formed between the two cylindrical portions of the partition wall member 34, while the inside of the partition wall member 34 is connected to the outlet 23 through the valve port 25 of the main valve 5.

Rotary vanes 38 integral with the partition wall member 34 are formed in the annular space 37. The partition wall member including the rotary vanes 38 is formed by casting according to the lost wax process and its wall surface is finished so as to have a rough skin. Of course, other casting methods may be used or, alternatively, a cutting or other processing method, provided that, at least the outer peripheral wall surface of the partition wall member is roughly finished.

According to the lost wax process adopted in this embodiment, the surface roughness of the wall surface is 15 to 60 μm in terms of a maximum height Rmax according to JIS (B 0601). If the wall surface is finished rough so that the surface roughness is not less than 10 μm Rmax, a good separation effect will be obtained.

Figure 2:
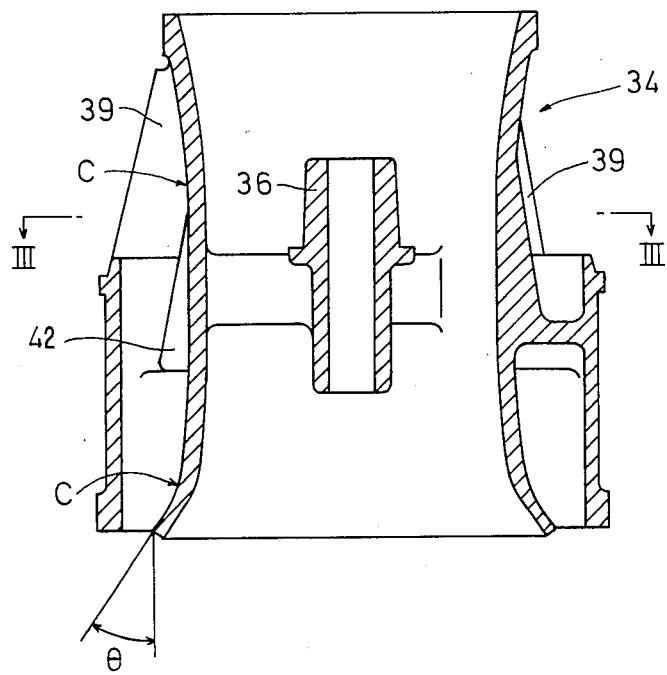
FIG. 2 is a longitudinal sectional view of the partition wall member of the invention.
Figure 3:
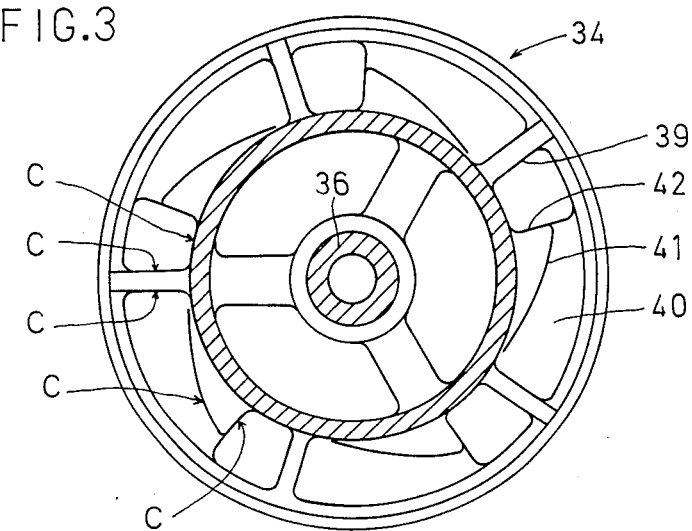
FIG. 3 is a cross-sectional view taken along the line III—III of FIG. 2.

The wall surfaces to be roughly finished are indicated by the reference character C shown in FIGS. 2 and 3.

Figure 4:
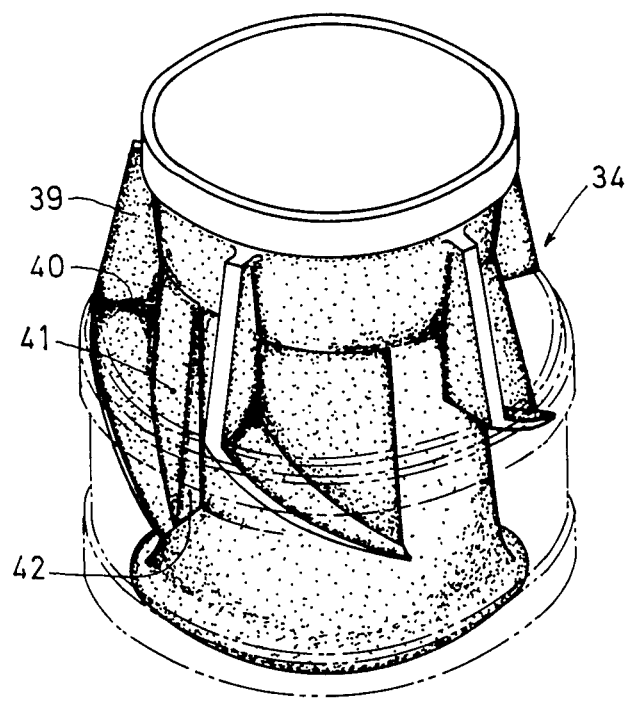
FIG. 4 is a perspective view of the partition wall member of the invention.

As shown on a larger scale in FIGS. 2 to 4, the rotary vanes 38 are each composed of a longitudinal wall 39 which projects radially from an upper end of the inside cylinder of the partition wall member 34 to an upper end of the outside cylinder thereof, an inclined vane 40 which is inclined obliquely downward from a lower end of the longitudinal wall 39 in a position between the outside and inside cylindrical portions, and a spiral vane 41 formed at an upper surface of the inclined vane 40 spirally from the inside cylinder toward the outside cylinder. Five rotary vanes 38 are formed in the annular space 37. A terminal end of the spiral vane 41 is connected in a stepped configuration to a radial end 42.

A lower portion of the inside cylinder of the partition wall member 34 expands gradually downwardly and terminates in the vicinity of and at a predetermined spacing from the inner wall of the outside cylinder. Its angle $\theta$ relative to a vertical direction is 35°. If the inclination angle $\theta$ is set in the range of 25° to 50°, there will be obtained a good separation effect.

The lower cover 9 is attached with bolts to the lower end of the casing 8 of the gas-water separator A to form the chamber 7 in the interior and a spherical float 43 is disposed within the chamber 7.

In the lower cover 9, a drain valve seat 44 is attached to an inner end of a drain port 45. The float 43 is covered with a float cover 46 having a connection opening 47 formed in the lower portion thereof. A vent hole 48 is formed in an upper portion of the float cover 46.

Fluid which has entered from the inlet 22 is rotated by the inclined vanes 40 of the rotary vanes 38. Water drops contained in the fluid are shaken out and separated outside by the action of centrifugal force. The longitudinal walls 39 allow the inflowing fluid to drop perpendicularly and offset the rotating flow created by the inclined vanes 40 to decrease the flowing velocity of the rotating flow and direct it more downwardly. At this time, the water drops partially strike against the longitudinal walls 39 and adhere to the surfaces thereof.

The spiral vanes 41 serve to direct the rotating flow more outwardly than in a tangential direction of the annular space 37. At the lower ends of the inclined vanes 40, the width of the annular space 37 becomes minimum and the flowing velocity becomes maximum. Since the terminal ends of the spiral vanes 41 are connected in a stepped configuration to the radial ends 42, the width of the annular space 37 expands suddenly with the connecting edge portions between the spiral vanes 41 and the ends 42 as a boundary. Consequently, as the fluid rotates, the areas near the ends 42 are reduced in pressure and the water drops adhered to the wall surface gather at the connecting ridge portions. The thus-gathered water drops are blown away from the connecting edge portions by the strong rotating flow and are blown against the inner surface of the casing 8 (also including the inner surface of the outside cylinder of the partition wall member 34).

The water drops thus separated flow down along the inner peripheral surface of the outside cylinder of the partition wall member 34 and that of the casing 8. The gas which has passed the lower end of the partition wall member 34 passes through the inside thereof and moves upwardly toward the main valve 5 of the reducing valve B and flows out to the outlet 23, while the separated water enters the interior of the float cover 46 through the connection opening 47. At this time, the gas present in the interior of the float cover 46 gets out through the vent holes 48. The float 43 moves up and down according to water levels to open and close the drain valve port of the drain valve seat 44 allowing only water to be discharged to the exterior from the drain port 45.

Thus, it will be seen that in accordance with the present invention, the cylindrical partition wall member and the obliquely, downwardly inclined vanes are positioned in the annular space, so that the moving direction of the fluid is changed in an obliquely downward direction when passing through the annular space. Consequently, the fluid rotates in the annular space because of its continuity and this rotation extends to above and below the inclined vanes. That is, the fluid enters the annular space while rotating and goes out also under rotation.

Since the spiral vanes 41 project outwardly gradually from upper ends toward lower ends of the inclined vanes 40, the fluid moves more outwardly than in a tangential direction of the annular space and is blown in a better condition against the inner surface of the casing located radially outwardly thereof. Further, since the width of the annular space becomes smaller toward the lower ends from the upper ends of the inclined vanes, the speed of the rotating flow increases gradually and becomes maximum at the lower end portion.

Moreover, since the spiral vanes 41 are connected in a stepped configuration to the radial ends 42 at the lower ends of the inclined vanes, the width of the annular space expands suddenly at those end portions. Consequently, as the fluid rotates, the pressure near the ends drops, and the water drops, adhered to nearby wall surfaces gather at the connecting edges between the spiral vanes and the ends, are then blown off by the strong rotating flow whose speed has reached its maximum at those connecting edge portions as previously noted and are blown against the inner surface of the outside cylinder.

The present invention produces some significant effects. Not only is a gas-water separator effected by the action of centrifugal force induced by fluid rotation, but also, water drops are gathered positively at the connecting edges between the spiral vanes 41 and the ends 42 and the speed of the rotating flow is rendered maximum at those edge portions to blow off the water drops from the same portions and allow them to be blown against the inner surface of the outside cylinder. Therefore, the gas-water separation efficiency is extremely high.

It is not that the speed of the rotating flow is merely increased, but that the width of the annular space is rendered minimum at the lower end portions of the inclined vanes thereby rendering the speed of the rotating flow maximum at important points, namely, at the lower end portions of the inclined vanes. Therefore, the rotating flow is gentle before and behind those portions, thereby preventing the water drops from being carried to the outlet side together with gas or preventing the water surface at the drain valve portion from being disturbed and causing a malfunction of the drain valve.

If the following points are taken into consideration in practicing the present invention, better functioning and effectiveness will be obtained.

If a longitudinal wall which projects radially from the outer peripheral surface of the partition wall member 34 is formed upwardly from an upper end of each inclined vane 40, the fluid which enters the annular space while rotating strikes against the longitudinal wall so that the water drops partially strike against and adhere to the longitudinal wall and are thereby separated from gas.

If at least an outer peripheral surface of the partition wall member 34 which includes the inclined vanes 40 and the spiral vanes 41 is so formed as to have a rough skin, water drops adhere to this outer peripheral surface more easily and the surface speed of the rotating flow in the vicinity of the wall surface is moderately decelerated, thus making it possible to catch water drops on the wall surface. The water drops thus caught on the wall surface are gathered at the connecting edge portions as previously described and blown against the inner surface of the outside cylinder. Thus, water drops can be separated from gas by adhering them to such a rough wall surface.

If the lower end portion of the partition wall member is projected outwardly gradually downward to narrow the spacing from the inner surface of the casing, the rotating flow again increases its speed and separates water from gas and is again blown against the inner surface of the casing. In this case, a desired function and effect is obtained if the angle of inclination $\theta$ of the lower end portion of the partition wall member relative to a vertical direction is set in the range of 25° to 50°. Particularly, if such inclination angle $\theta$ is set at 35°, the best results will be obtained.

While specific embodiments of the invention have been shown and described in detail to illustrate the application of the inventive principles, it will be understood that the invention may be embodied otherwise without departing from such principles.

What is claimed is:

1. A gas-water separator comprising:
    a casing having an inlet, an outlet and a drain valve and defining an upper portion of said gas-water separator, an inlet side, a drain valve portion and an outlet side;
    a cylindrical partition wall member defining an inside bore disposed in said upper portion within said casing to form an annular space between said partition wall member and said casing located outside said partition wall member, said annular space having upper and lower portions which, together with said inside bore, are in communication with said inlet side, said drain valve portion and said outlet side, respectively; and
    obliquely downwardly inclined vanes and spiral vanes formed on an outer peripheral surface of said partition wall member, said spiral vanes projecting outwardly gradually from an upper end of each of said inclined vanes toward a lower end thereof and being connected in a stepped configuration to a radical end at the lower end of said inclined vanes.

2. A separator according to claim 1, further including lognitudinal walls projecting radially from the outer peripheral surface of said partition wall member, said longitudinal walls being formed upwardly from the upper ends of said inclined vanes.

3. A separator according to claim 1, wherein at least said outer peripheral surface of said partition wall member is formed with a rough surface.

4. A separator according to claim 1, wherein said partition wall member includes a lower end portion which is projected outwardly and gradually downwardly to narrow the spacing from an inner surface of said casing so that an inclination angle of said lower end portion relative to the vertical direction is within the range of 25° to 50°.

5. A separator according to claim 4, wherein said inclination angle is 35°.

* * * * *